(No Model.)

M. PAYNE & D. BENSON.
ELECTRIC BELT.

No. 340,815. Patented Apr. 27, 1886.

Witnesses:
Christopher Life
Asa McCreery

Inventors:
Morgan Payne
Daniel Benson
By C. W. Alexander
Atty.

UNITED STATES PATENT OFFICE.

MORGAN PAYNE AND DANIEL BENSON, OF CARDINGTON, OHIO.

ELECTRIC BELT.

SPECIFICATION forming part of Letters Patent No. 340,815, dated April 27, 1886.

Application filed June 1, 1885. Serial No. 167,326. (No model.)

*To all whom it may concern:*

Be it known that we, MORGAN PAYNE and DANIEL BENSON, citizens of the United States, residing at Cardington, in the county of Morrow and State of Ohio, have invented certain new and useful improvements in magnetic and electric appliances to apply to the human body for the cure of diseases, of which the following is a specification.

This invention relates to certain improvements in electric belts, and it has mainly for its object to provide an improved battery for the same, in which the positive and negative elements are so arranged as to form a receptacle for the exciting-fluid, as more fully hereinafter described. These objects I attain by means illustrated in the accompanying drawings, in which—

Figure 1:
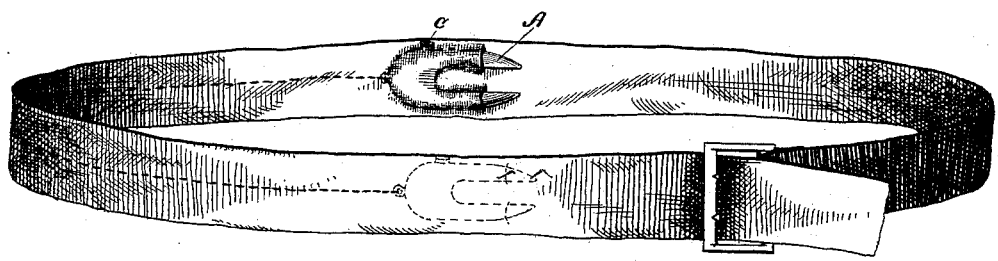
Figure 2:
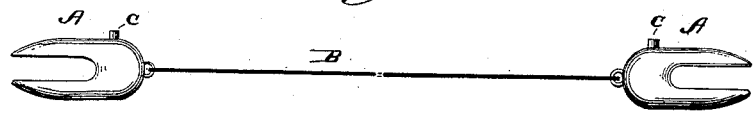
Figure 3:
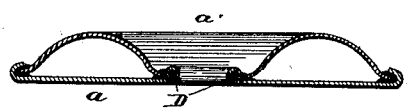

Figure 1 illustrates a perspective view of a belt, showing a battery of two cells secured thereto; Fig. 2, an elevation showing the cells detached and their connecting conducting-wires, and Fig. 3 a transverse sectional view of one of the cells of the battery detached.

In the drawings, the letter A indicates the cells of the battery, which, in the present instance, are two in number and connected by the conducting-wires B in the manner more fully hereinafter explained.

The cells each consist of a zinc plate, *a*, slightly dished, so as to set closely to the body of wearer, and a copper plate, *a'*, of corresponding shape, deeply dished, and with its concave side toward the plate *a*, so as to eave a hollow space between the two when secured together for the reception of the exciting-liquid. The plates are preferably oval in shape and are cut out from one end in the line of their longest diameter, as shown, so as to leave a longitudinal slot when the parts are placed together. The outer edges of the zinc plate are bent upward and over the edges of the copper plate, the bent edges being continued around in the slot, and the parts are united and made fluid-tight by some insulating material which insulates the elements of the cells electrically, for the purpose more fully hereinafter specified. This material may be rubber, glass, or vitreous enamel, and may be applied and set in between the joints, so as to pack the parts and at the same time prevent metallic contact. The edge of the copper plate may be enameled prior to placing the parts together, and the whole afterward united by heating the same to a sufficient degree to melt the enamel, which is of such a character as to melt at a temperature below the melting-point of the zinc, so as not to destroy the same.

The cells are provided with screw-threaded openings for filling, which are closed by means of screw-caps C. Around the edges of the slotted portion is secured a wire, D, bent to conform to the shape of the slot, and which serves to strengthen the device.

The cells, if desirable, may be packed with absorbent material to hold the exciting-fluid more conveniently.

The cells are secured to the inside of the belt, as indicated in Fig. 1 of the drawings, and are connected by the insulated wires B, before mentioned, one passing from the copper plate of one cell to the zinc plate of the other, and the other from the upper plate of the last-mentioned cell to the zinc plate first mentioned, so as to establish and maintain a constant voltaic current.

Having thus described our invention, what we claim, and desire to secure by Letters Patent, is—

1. A battery-cell for electric belts, composed of two plates, one of copper and one of zinc, cemented together at their edges by means of insulating material, the plates being so shaped as to leave a space for the exciting material, substantially as specified.

2. A battery-cell for electric belts, consisting of plates of copper and zinc of oval shape having a portion cut away, as described, the parts being united by insulating material, and the slotted portion provided with a bent wire secured around its edges, substantially as specified.

MORGAN PAYNE.
DANIEL BENSON.

Attest:
CHRISTOPHER SIPE,
ASA McCREARY.